Nov. 5, 1940.  J. O. OLSEN  2,220,268
MACHINE TOOL
Filed Jan. 15, 1937  4 Sheets-Sheet 1
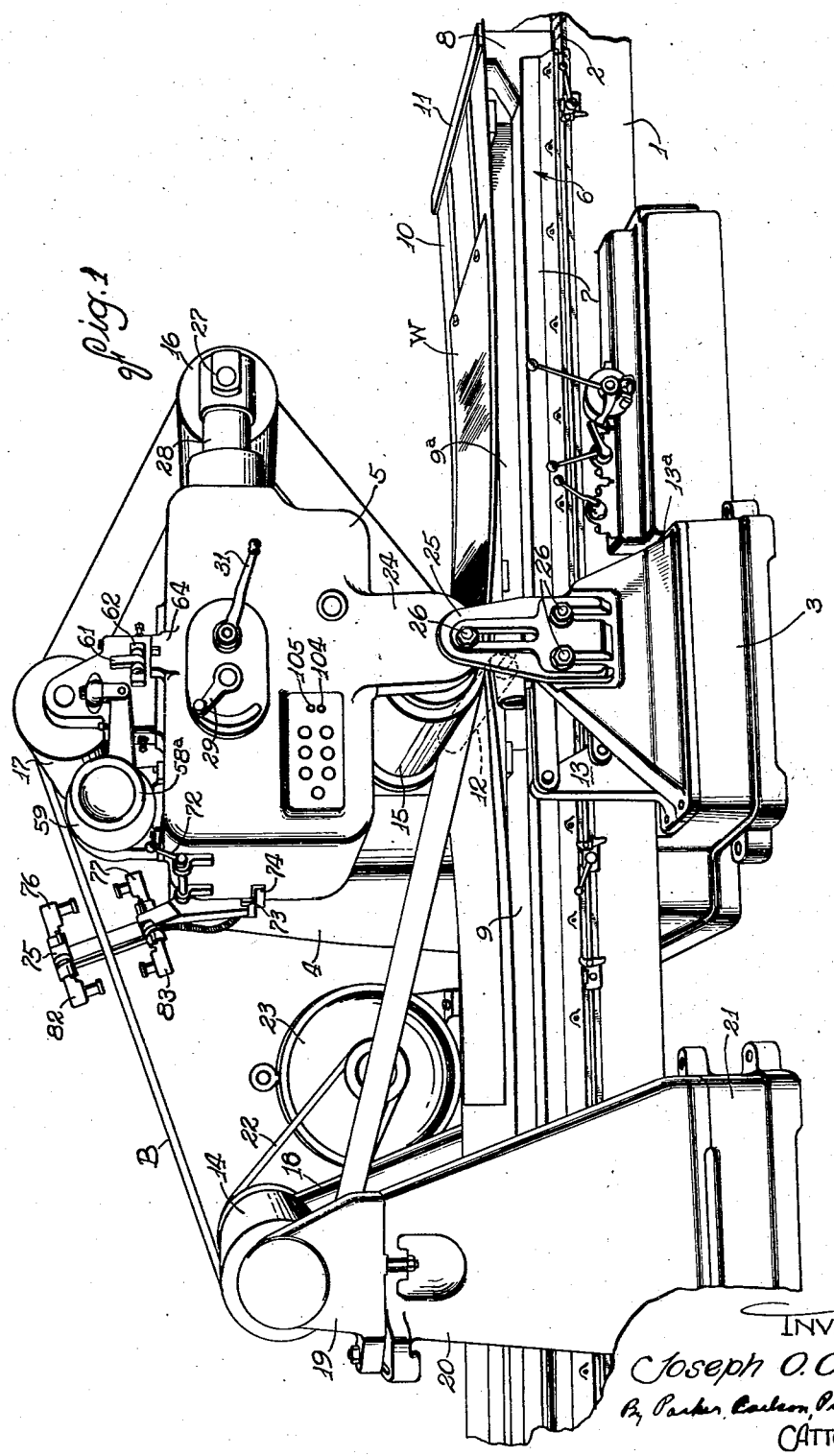
INVENTOR
Joseph O. Olsen
By Parker, Carlson, Pitzner & Hubbard
ATTORNEYS

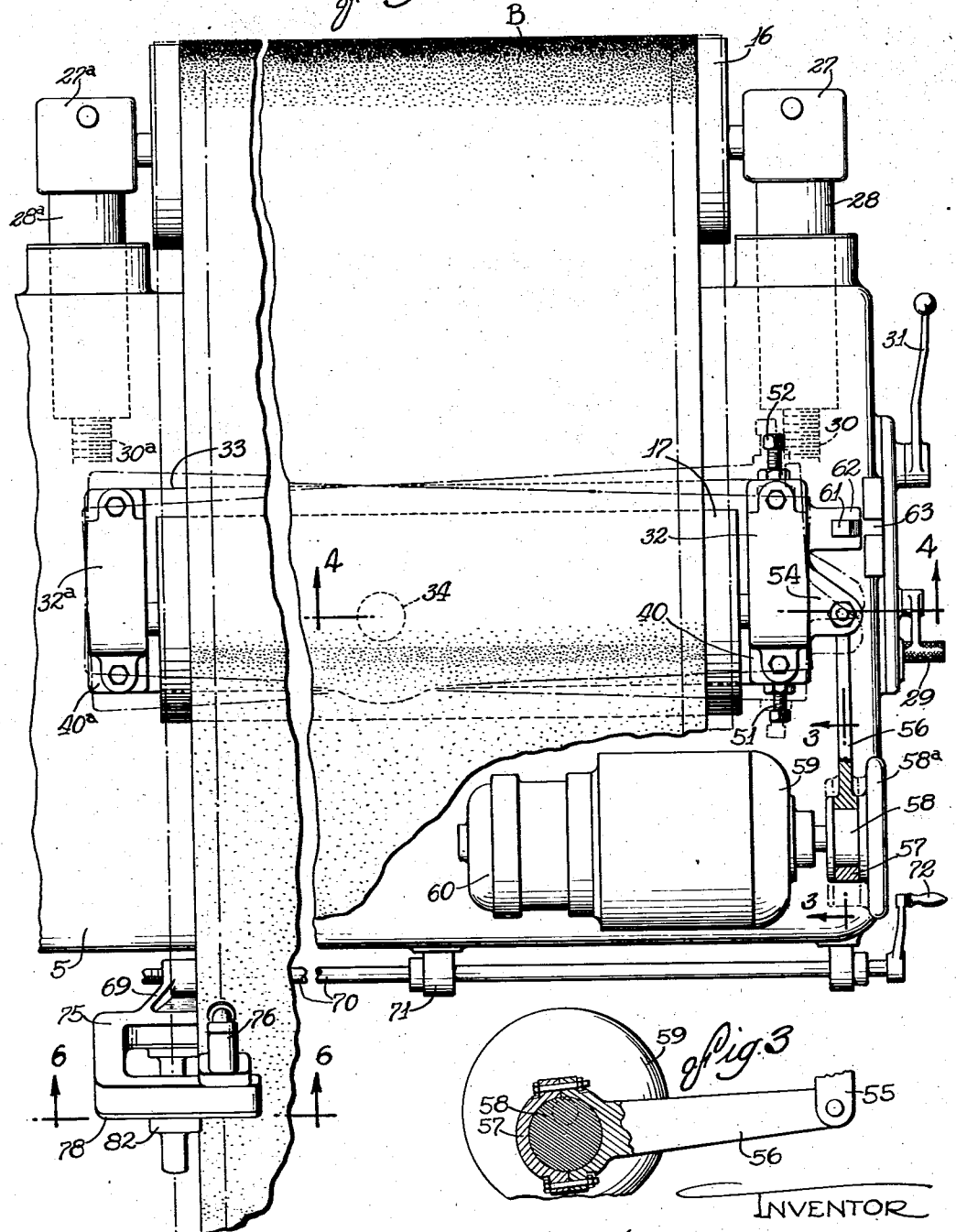

Nov. 5, 1940.   J. O. OLSEN   2,220,268
MACHINE TOOL
Filed Jan. 15, 1937   4 Sheets-Sheet 3
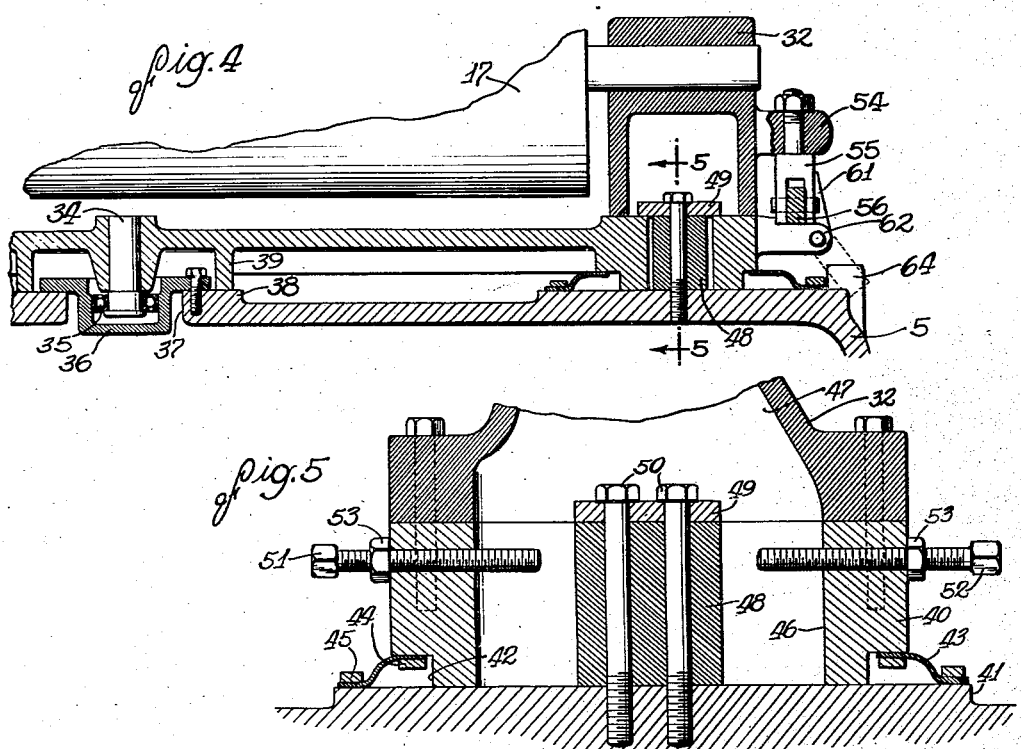
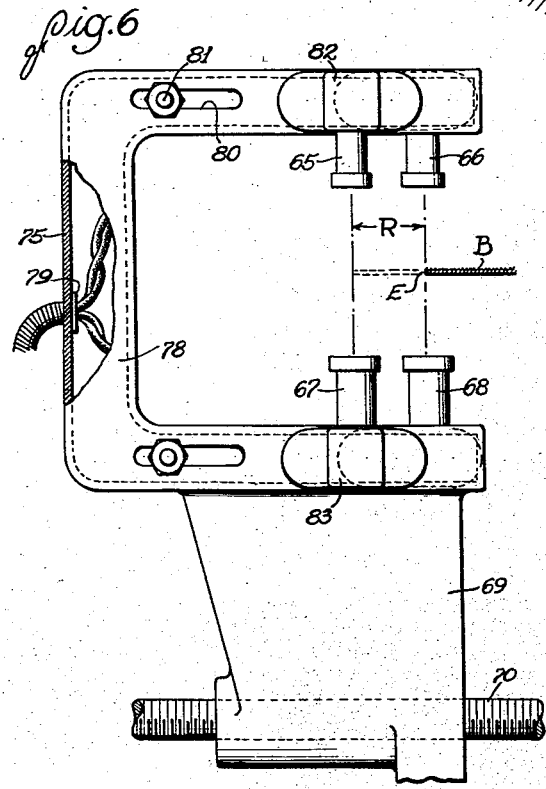
INVENTOR
Joseph O. Olsen
ATTORNEYS

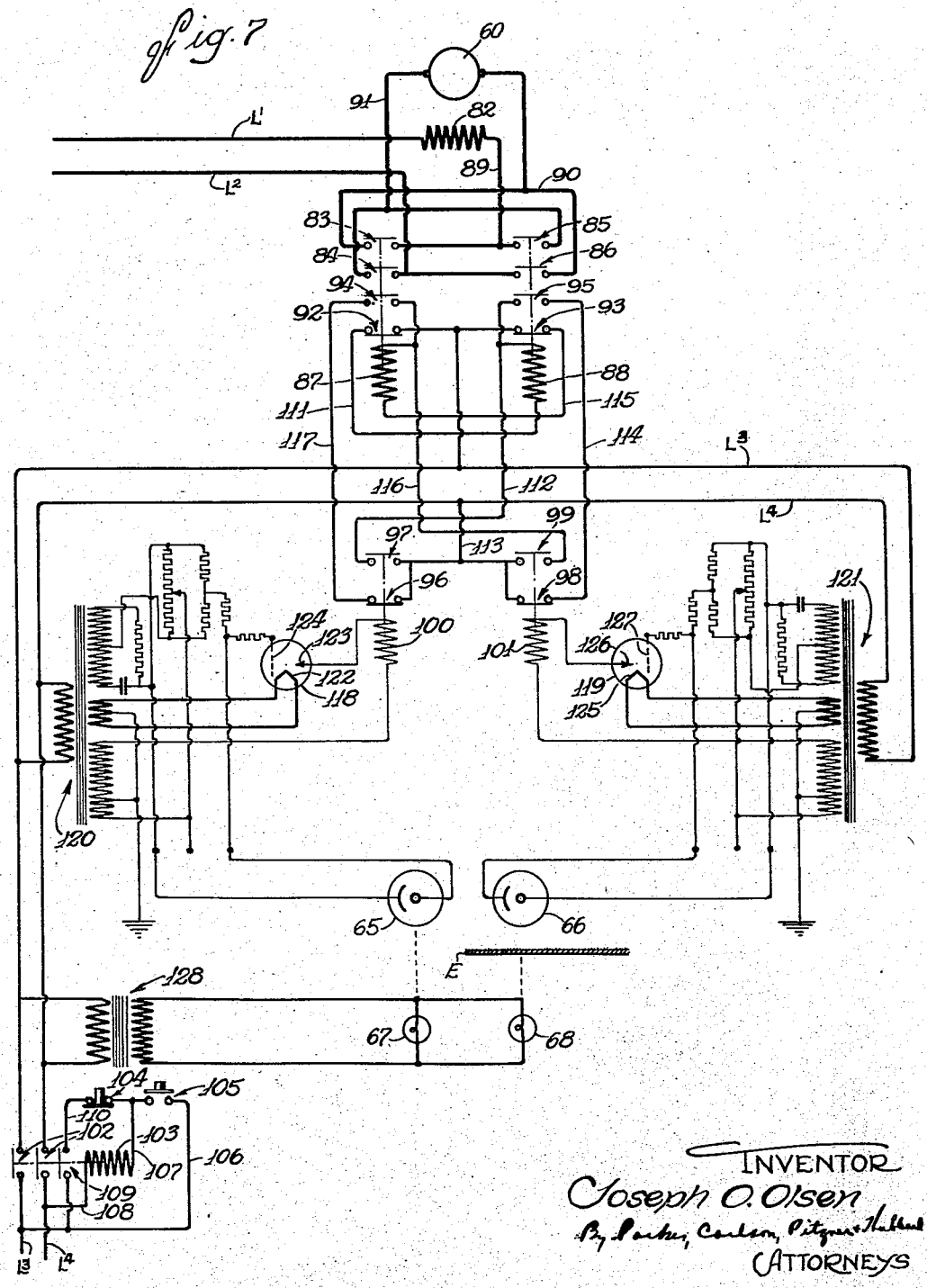

Patented Nov. 5, 1940

2,220,268

UNITED STATES PATENT OFFICE 2,220,268

MACHINE TOOL

Joseph O. Olsen, Rockford, Ill., assignor to Mattison Machine Works, Rockford, Ill., a corporation of Illinois Application January 15, 1937, Serial No. 120,759

13 Claims. (Cl. 51—142)

The present invention relates to improvements in machine tools, and has particular reference to a new and improved machine for abrading or polishing metal work pieces.

One of the primary objects of the present invention resides in the provision of a novel machine tool having a grinding or polishing belt which is shifted or oscillated to and fro through a predetermined range laterally of the direction of travel. Difficulties have been encountered heretofore, particularly at high speeds, in maintaining abrasive tool belts in position on their guides. The belts tend to creep laterally due to unequal tension and other factors, with the result that the edges are likely to become frayed or damaged. By shifting the belt laterally through a controlled range, it is always maintained in operative position so that the foregoing difficulties are entirely overcome. Shifting of the belt also has the advantage that, where a high finish on the work is desired, scratch marks on the work surface are minimized, and that, for relatively narrow work, all portions of the belt may be used and worn uniformly.

Other objects reside in effecting the reversible lateral shifting of the belt by new and improved means which is operable either manually or automatically, which can be rendered inoperative, which is adjustable to vary the rate or speed of shift, and which specifically effects the shifting by leading the belt through angularity of the guide.

Still another object is to provide a novel gauge or detector means for determining and accurately maintaining a predetermined range of shift.

Various detailed objects reside in the provision of a new and improved range control which is adjustable to vary the extent of the range of reciprocation and independently adjustable to vary the location of the range, so as to permit the use of belts of different widths and to adapt the belt to different sizes and location of the work.

Further general objects are to provide a novel range control which is highly accurate and quickly responsive, which is out of contact with the belt, and which is operative regardless of irregularities of the belt.

Other objects and advantages will become apparent as the description proceeds.

In the accompanying drawings:

Figure 1 is a fragmentary perspective view of a machine embodying the features of my invention.

Fig. 2 is a fragmentary plan view of the machine and illustrating in particular the belt support and operating means.

Fig. 3 is a fragmentary detail sectional view taken substantially in the plane of the line 3—3 of Fig. 2.

Fig. 4 is a fragmentary vertical sectional view taken substantially in the plane of the line 4—4 of Fig. 2.

Fig. 5 is a fragmentary sectional view on an enlarged scale taken along the line 5—5 of Fig. 4.

Fig. 6 is a side elevational view of the range control device, and taken substantially along the line 6—6 of Fig. 2.

Fig. 7 is a diagrammatic representation of the electric circuits forming part of the control device.

While the invention is susceptible of various modifications and alternative constructions, I have shown in the drawings and will herein describe in detail the preferred embodiment, but it is to be understood that I do not intend to limit the invention by such disclosure but aim to cover all modifications and alternative constructions falling within the spirit and scope of the invention as expressed in the appended claims.

Referring more particularly to the drawings, the machine constituting the exemplary embodiment of the invention comprises an elongated horizontal bed 1 formed on the top with suitable longitudinal ways 2. The bed 1 is supported in spaced relation above the machine foundation intermediate its ends by a pedestal 3 and at its ends by pedestals (not shown). The intermediate pedestal 3 projects to the front and rear of the bed 1, and at the rear is rigid with an upright column 4. An overarm or head 5 is adjustably mounted on the upper end of the column 4 and extends therefrom transversely of the bed 1.

Mounted on the ways 2 for reciprocation longitudinally of the bed 1 and beneath the head 5 is a work support or carriage 6. The means for reciprocating the carriage 6 is not disclosed in detail, since per se it forms no part of the present invention, and may be of any suitable or well known character as is understood in the art. The carriage 6 also may be provided in different forms depending upon the kind of work pieces that are to be machined. In the illustrative embodiment of the invention, the machine is especially adapted for abrading, and particularly polishing, the surfaces of long flexible metal sheets, such, for example, as the sheet W. Hence, the carriage 6 preferably comprises a rigid elongated base 7 and upstanding brackets 8 (of which one is shown in Fig. 1) secured respectively to the four corners thereof. A plurality of parallel guide bars are rigidly interconnected to form two stationary supporting structures 9 and 9ª which are rigidly joined at their outer ends to the outer ends of the bed 1, and which extend inwardly between the corner brackets 8 and over opposite ends of the carriage base 7. Connected to the carriage 6 for movement therewith is a flexible strip or apron 10 which rests slidably on the bar structure 9 and 9ª, and which is adapted to support the work. In the preferred form, one end of the apron 10 is secured or anchored to a cross bar 11 bridging and attached to the corner brackets 8 at one end of the carriage base 7, for example the right end in Fig. 1, and the other end of the apron is unattached, the action of the belt being relied upon to hold the apron taut, and hence being in a direction away from the apron anchor. Work pieces of various sizes may be supported on the apron 10.

Supporting the apron 10 in the course of reciprocation and at a point between the bar structures 9 and 9ª and beneath the head 5 is an idler pressure roller 12. This roller is supported at the front end by a suitable bearing structure 13 adjustably mounted on the front end of the pedestal 3, and having an upward resilient thrust and a vertical straight-line adjustment for varying the thrust pressure. It will be understood that a similar bearing structure (not shown) is provided for the rear end of the roller 12. Hence, the roller 12 is pressed upwardly, with a floating action transversely of the bed 1, to impart a uniform pressure throughout its effective length against the underside of the apron 10. The details of the bearing structures per se for the roller 12 form no part of the present invention, and hence are not fully disclosed.

The tool element of the machine is provided in the form of an endless belt B having an outer abrading or polishing surface, and extending in a downward bight for operative line engagement with the top of the work piece W at a point over the roller 12. The tool belt B runs over a plurality of rollers, and is operatively positioned thereby in registration laterally with the apron 10 and the work piece W. In the present instance, four rollers 14, 15, 16, and 17 are provided, all of which serve to guide and position the belt B, and of which one of the rollers 14 or 15, for example, the roller 14, serves as the drive, the roller 15 serves to present the lower run of the belt to the work piece W, the roller 16 is adjustable to vary the tension as desired, and the roller 17 produces a bight in the upper run of the belt B over the head 5.

The drive roller 14 is journaled at its rear end in the upper end portion of a standard 18, and at its front end in a bracket 19 on a standard 20, both standards being mounted on a pedestal 21 extending transversely beneath the bed 1. To permit removal of the belt B, the bracket 19 is removably clamped in position, and has a pivotal and sliding connection with the standard 20 so that it may be swung out of the way when released. The rear end of the roller 14 is connected for a power drive through a belt 22 to an electric motor 23 suitably mounted on the rear end of the pedestal 21. It will be understood that the pedestal 21 may be mounted in any desired position, independently of the pedestal 3, on the foundation with the roller 14 in proper alignment and parallelism with the rollers 12 and 15.

The roller 15 is journaled at the rear end in the head 5, and at the front end in a depending arm or bracket 24 on the head 5. An arm 25 has vertically adjustable slot and bolt connections 26 with brackets 13ª and 24 to provide increased rigidity. It will be seen that the work piece W in its movement between the rollers 12 and 15 is presented to the tool belt B at a predetermined cutting pressure.

The tension-adjusting roller 16 (see Figs. 1 and 2) is journaled at opposite ends in universal pivot blocks 27, 27ª on the ends of two supporting rams or sleeves 28, 28ª slidably disposed in one side of the head 5 for adjustment transversely of the roller axis. These sleeves may be adjusted, independently or jointly under the control of a clutch (not shown) having a shift lever 29, through the medium of a transmission mechanism having adjusting screws 30, 30ª in operative engagement therewith, and having an operating hand lever 31. For a more detailed description of the transmission mechanism, reference may be had to Olsen and Johnson application Serial No. 706,966, filed January 17, 1934. It will be seen that the tension roller 16 may be adjusted bodily or angularly as required to tension the belt B substantially uniformly throughout the width thereof.

Provision is made for shifting the belt B continuously back and forth laterally of the direction of travel in order to minimize scratch marks on the surface of the work where a high finish is desired, and also to retain the belt at all times in proper position on the rollers 14 to 17. To this end, the guide roller 17 is mounted on the head 5 for oscillation so that in one extreme angular position, the belt is led laterally in one direction, and in the other extreme angular position, the belt is led in the other direction, without tensioning one edge of the belt more than the other. By confining the lateral movement of the belt to a predetermined range, uncontrolled creeping of the belt partly off the rollers and into interference at one or the other of the edges with the machine structure, as otherwise is likely to occur particularly at high speeds, is avoided.

In the preferred form, the shaft of the roller 17 is journaled in suitable bearing blocks 32, 32ª bolted on opposite ends of a supporting plate 33 mounted for oscillation on the top of the head 5. More particularly, the plate 33 is provided with a fixed vertical stub shaft 34 midway of the ends of the roller 17 and intersecting the roller axis. This shaft is journaled in an anti-friction bearing 35 mounted in a housing 36 bolted in position within an opening 37 in a finished pad 38 on the head 5. An annular flange 39, concentric with the shaft 34, is formed on the underside of the plate 33, and bears against the pad 38 about the housing 36 to enclose the bearing 35 against the entry of foreign matter.

The forward end of the plate 33 is rigid with a guide block 40 which is machined on the underside for sliding engagement with a finished pad 41 on the head 5 (see Figs. 4 and 5), and which is formed with a peripheral notch 42 in its lower edge. The bearing surfaces are enclosed by an air-tight flexible seal comprising a flexible strip 43 secured by clamp bars 44 and 45 respectively to the plate 40 and the pad 41.

Suitable guide means is provided for maintaining the plate 33 in bearing engagement with the pads 38 and 41. Thus, the block 40 is formed with a transverse slot 46 opening therethrough to the pad 41, and the block 32 is formed in the underside with a space 47 coextensive in length with but somewhat wider than the slot. A stationary block 48 is secured to the pad 41 within the slot 46. The block 48 is substantially coextensive in height with the slot 46, but is shorter so as to permit lateral movement of the plate 33 and is narrower to allow for the curvature of movement about the shaft 34. Secured to the top of the block 48 and slidably engaging the upper marginal edges of the slot 46 is a gib plate 49. Preferably, the block 48 and the gib plate 49 are secured together and jointly to the pad 41 by means of a plurality of bolts 50. It will be evident that the gib plate 49 serves to confine the block 40 slidably against the pad 41 while permitting oscillation about the shaft 34, and that the guide faces are fully enclosed.

The rear end of the plate 33 is constructed and guided in the same manner as the forward end just described, and hence, apart from the block 40ª which corresponds to the block 40, is not shown in detail.

The rate at which the belt B will shift laterally for a given drive is determined by the degree of inclination of the roller 17, and is subject to adjustment in order to accommodate different working conditions and requirements. To this end, the center block 48 is utilized as a stop abutment adapted for selective engagement with the ends of two stop screws 51 and 52 adjustably threaded respectively through the opposite end walls of the slot 46. Lock nuts 53 are provided for securing the screws 51 and 52 in position of adjustment. The degree of oscillation as well as the location of oscillation of the roller 17 relative to the belt B are determined and independently subject to adjustment by the adjustment of the screws 51 and 52 relative to the block 48.

To provide power means for oscillating the roller 17, the bearing block 32 is formed with a forwardly projecting ear 54 to which a depending forked pivot bearing 55 is bolted. A pitman 56 is pivoted at one end in the bearing 55, and at the other end has a split strap 57 (see Figs. 2 and 3) encircling an eccentric 58 connected through a gear reduction mechanism 59 to a reversible torque motor 60 mounted on the head 5. Upon operation of the motor 60 in either direction, the roller 17 will be pivoted about the shaft 34 in a corresponding direction through the range defined by the screws 51 and 52 which is less than the full throw of the eccentric 58. Thereupon, the motor will stall until the operation is reversed.

On occasions when shifting of the belt B is not desired, the roller 17 may be locked in an intermediate position in parallelism with the rollers 14 and 15. The means for this purpose is a dog 61 (see Figs. 1 and 2) pivotally mounted in a forwardly projecting lug 62 on the block 40, and adapted in inoperative position to lean rearwardly of the pivot against the block, and when desired to be swung forwardly and downwardly into a notch 63 in a fixed lug 64 on the head 5. It will be understood that when the roller 17 is locked in position by the dog 61, the operating mechanism for oscillating the roller, if automatic as hereinafter described, should be disabled.

The use of the torque motor 60 lends itself advantageously to either a manual or an automatic control of the shifting of the belt B. When the control is effected manually, as by means of a hand wheel 58ª rigid with the eccentric 58, the range through which the belt will shift is determined by the time element and the speed of shift.

One of the primary features of the invention resides in the provision of automatic means for controlling the motor 60 to effect shifting of the belt B through a predetermined adjustable range. Preferably, this means is responsive in its operation to the movements of the belt, but without direct mechanical contact therewith. Although the invention in its broad aspects is not limited to any specific type or form of range detector, the automatic control means preferably comprises two photo-electric cells 65 and 66 (Fig. 6) mounted in operative relation to one edge of the belt B, and spaced laterally thereof to define the range of shift. The cells 65 and 66 are so arranged in the electric control circuits for the motor 60 that when the controlling edge E, i. e. the rear edge, of the belt B interrupts a beam of light to the cell 65, the motor will operate to effect forward movement of the belt, and when the belt edge E permits the passage of a beam of light to the cell 66, the motor will operate to effect rearward movement of the belt. By associating the two cells with only one edge of the belt B, instead of both edges, the form of the other edge is not a critical factor, and a more compact unit is obtained.

The cells 65 and 66 are disposed in spaced relation to one surface of the belt B for movement of the edge E across the light inlets thereof, and are aligned in a direction perpendicular with the selected portion of the belt respectively with two suitable light sources, such as electric filaments 67 and 68, disposed opposite the other surface of the belt, and having adjustable lenses to provide two concentrated beams of light. Thus, the upper course of the belt B between the rollers 14 and 17 is shiftable laterally in a plane between the cells 65 and 66 and the lights 67 and 68 through a range R defined by the spacing of the cells as illustrated in Fig. 6. Preferably, the cells 65 and 66 are disposed above the belt B with their light inlets opening downwardly so as to be unaffected by extraneous light from overhead sources, such as skylights, artificial lighting, etc.

A generally vertical bracket 69 is provided for conveniently mounting the cells 65 and 66 and the lights 67 and 68 on the side of the head 5. The bracket 69 is threaded intermediate its ends on a screw 70 which is journaled in lugs 71 (Fig. 2) on the side of the head 5, and which extends transversely of the belt B to the front of the machine where it is provided with a hand lever 72. The lower end of the bracket 69 is formed with a notch 73 (Fig. 1) slidably engaging a guide bar 74 on the head 5 to prevent rotation about the screw 70, while permitting adjustment along the screw as required for proper location of the cells 65 and 66 relative to the belt edge E regardless of the width of the belt or the position thereof on the rollers 14 to 17. Hence, belts of different widths may be selectively employed, and may be guided to travel along any desired transverse portion of the carriage 6 depending on the character and location of different kinds of work.

The upper end of the bracket 69 is formed with a generally vertical U-shaped frame 75 which is channel-shaped in cross-section and open at one side, and the legs of which project forwardly respectively above and below the rear edge portion of the belt B. The cell 66 and the associated light 68 are mounted respectively in holders 76 and 77 (Fig. 1) which are rigidly secured in any suitable manner respectively to the arms of the frame 75 at the closed side and project laterally therefrom. A U-shaped plate 78 is adjustably secured to the open side of the frame 75, and serves to close the latter, thereby providing a closed conduit space from a central inlet bushing 79 for the electric leads to the cells and lights. In the preferred form of securing means for the plate 78, each of the legs is provided with a longitudinal slot 80 through which extends a clamp bolt 81 from the frame 75. The cell 65 and the associated light 67 are mounted respectively in holders 82 and 83 (Figs. 1 and 6) which are rigidly secured in any suitable manner respectively to the arms of the plate 78, and project laterally therefrom in a direction opposite that of the holders 76 and 77.

It may be desirable under different set-up or working conditions to adjust the range R of belt shift. For example, where relatively wide work pieces W are being machined, the limits of the belt may necessitate a comparatively small range R in order to maintain full surface cutting engagement when required. Contrarily, for relatively narrow work pieces W, the range R may be relatively wide so that all portions of the belt B will be used and worn uniformly. Still other conditions, such, for example, as the cutting speed, the nature of the finish, the character of the work or belt, etc., may be influencing factors. It will be evident that the adjustability of the plate 78 permits adjustment of the range R.

Referring now to Fig. 7, the motor 60 may have any suitable circuits, and as shown has a series field winding 82, and is adapted to be connected reversibly across direct current mains $L_1$ and $L_2$ under the control of two sets of normally open switches 83 and 84, and 85 and 86 operable respectively by coils 87 and 88. When the coil 87 is energized, a circuit is completed from the main $L_1$, through the field 82, a line 89, the switch 83, a line 90, the motor 60, a line 91, and the switch 84 to the main $L_2$. Thereupon, the motor 60 will operate to effect rearward shifting of the belt B. When the coil 88 is energized, a circuit is completed in a reverse direction through the motor 60 from the main $L_1$ through the field, the line 89, the switch 85, the line 91, the motor 60, the line 90, and the switch 86 to the main $L_2$. Thereupon the motor 60 will operate to effect forward shifting of the belt B.

The coils 87 and 88 also control respectively two normally closed switches 92 and 93 and likewise two normally open switches 94 and 95, and are in turn controlled by two sets of switches 96 and 97, and 98 and 99 operable respectively by coils 100 and 101. Normally, the switches 96 and 98 are closed, and the switches 97 and 99 are open.

Alternating current for the coils 87 and 88 is adapted to be supplied from mains $L_3$ and $L_4$ in which a normally open starting switch 102 is interposed. The switch 102 is operable by a coil 103 under the control of a normally closed stop switch 104 and a normally open starting switch 105. When the switch 105 is closed, a circuit is completed from the main $L_3$, through a line 106, the switch 105, a line 107, the coil 103 and a line 108 to the main $L_4$. Excitation of the coil 103 closes the switch 102, and also a switch 109 establishing a holding circuit across the switch 105 from the main $L_3$, through the line 106, the switch 109, a line 110, the stop switch 104, the line 107, the coil 103, and the line 108 to the main $L_4$.

Assuming the switch 102 to be closed, excitation of the coil 100 closes a circuit from the main $L_3$, through the switch 92, a line 111, the coil 88, a line 112, the switch 97 and a line 113 to the main $L_4$. Thereupon, the switches 85 and 86 are closed as described, and a holding circuit for the coil 88 across the switch 97 is established from the line 112, through the switch 95, a line 114, and the switch 98 to the line 113. At the same time, the switch 93 is opened to prevent excitation of the coil 87 until the coil 88 is again deenergized.

Upon subsequent excitation of the coil 101, the switch 98 is opened to deenergize the coil 88. As soon as the switch 93 is closed, a circuit is completed from the main $L_3$, through the switch 93, a line 115, the coil 87, a line 116, the switch 99 and the line 113 to the main $L_4$. Thereupon, the switches 83, 84 and 94 are closed to establish a holding circuit for the coil 87 from the line 116, through the switch 94, a line 117, and the switch 96 to the line 113, and the switch 92 is opened to interlock the coils 87 and 88 against simultaneous excitation.

Selective excitation of the coils 100 and 101 is under the respective control of two grid-glow tubes 118 and 119 in turn under the control of the cell and light sets 65, 67 and 66, 68. The lights 67 and 68 are constantly connected through a transformer across the mains $L_3$ and $L_4$. The coils 100 and 101, tubes 118 and 119, and cells 65 and 66 are arranged in two sets of circuits connected respectively through transformers 120 and 121 across the mains $L_3$ and $L_4$. These sets of circuits per se form no part of the present invention, are well understood in the art, and hence are not described in detail.

Considering first the coil 100, the tube 118 has a filament or cathode 122, an anode 123, and a grid 124. Normally, a voltage sufficient to effect a flow of current between the electrodes 122 and 123 is impressed between the grid 124 and the cathode, and thereupon the coil 100 will be energized. The grid potential is under the control of the cell 65 which when exposed to light passes a current in one direction to reduce the grid voltage below that required to operate the tube 118. Hence, when the edge E of the belt B interrupts the light beam to the cell 65, the grid voltage rises to its normal value so as to effect excitation of the coil 100, and thereby resulting in forward shifting of the belt. This reversal immediately moves the belt edge E away from the cell 65, whereupon the grid voltage is again depressed to effect deenergization of the coil 100. Such deenergization does not cause a reversal of the motor 60, but prepares the motor circuit for a reversal upon subsequent excitation of the coil 101. Hence, the momentary interception of light to the cell 65 by the belt edge E at the rearward point of movement of the belt B causes a momentary excitation of the coil 100 to effect the belt reversal.

Referring now to the coil 101, the tube 119 has a filament or cathode 125, an anode 126 and a grid 127 interconnected with the cell 66 to the transformer 121. In this case, the circuits are so arranged that the normal grid voltage is below that required to operate the tube 119, and that the cell 66 when exposed to light will pass a current in one direction to raise the grid voltage sufficiently to effect excitation of the coil 101. When the belt edge E exposes the cell 66 to light at the forward limit of movement, the motor 60 is reversed to effect rearward movement of the belt B.

The photo-electric unit is responsive instantaneously, and will react sensitively to all changes in light intensity regardless of speed. In general, the photo-electric unit will operate in one direction when the light beam passes from the light source to the photo-electric cell, and in the other direction when the light beam is interrupted.

I claim as my invention:

1. In a metal polishing machine, in combination, a head, a plurality of guide rollers supported in generally parallel relation about said head, a tool belt running over said rollers, a base plate in which one of said rollers is journalled and which is mounted on said head for angular adjustment about an axis intermediate the ends of said one roller and generally perpendicular to the travel of said belt over said one roller, enclosed guide means for maintaining said plate in bearing engagement with said head and for guiding the plate in its adjustment about said axis, and means for oscillating said plate about said axis.

2. In a metal polishing machine, in combination, a head, a plurality of guide rollers supported in generally parallel relation about said head, a tool belt running over said rollers, a base plate in which one of said rollers is journalled and which is mounted on said head for angular adjustment about an axis intermediate the ends of said one roller and generally perpendicular to the travel of said belt over said one roller, coacting members on said head and said plate for guiding the plate in its movement about said axis, and means for oscillating said plate about said axis alternately into two limit positions of opposed inclination relative to the other of said rollers whereby to effect lateral shifting of said belt in the course of travel respectively in opposite directions.

3. In a metal polishing machine, in combination, a head, a plurality of guide rollers supported in generally parallel relation about said head, a tool belt running over said rollers, a base plate in which one of said rollers is journalled and which is mounted on said head for angular adjustment about an axis intermediate the ends of said one roller and generally perpendicular to the travel of said belt thereover, a transverse slot in one end of said plate, a block secured to said head and extending through said slot, a gib plate secured to said block and slidably engaging the edges of said slot to confine said plate against said head, stop screws adjustably threaded through said plate into opposite ends of said slot for selective engagement with opposite sides of said block to define the range of oscillation of said plate, and means for oscillating said plate about said axis.

4. In a metal polishing machine, in combination, a head, a plurality of guide rollers supported in generally parallel relation about said head, a tool belt running over said rollers, a base plate in which one of said rollers is journalled and which is mounted on said head for angular adjustment relative to the other of said rollers, a transverse slot in said plate, a block secured to said head and extending through said slot, stop screws adjustably threaded through said plate into opposite ends of said slot for selective engagement with opposite sides of said block to define the range of oscillation of said plate, and means for adjusting said plate.

5. In a metal polishing machine, in combination, a head, a plurality of guide rollers supported in generally parallel relation about said head, a tool belt running over said rollers, a base plate in which one of said rollers is journalled and which is mounted on said head for angular adjustment about an axis intermediate the ends of said one roller, enclosed guide means for confining said plate for adjustment on said head, adjustable means for defining the range of oscillation of said plate, a notched lug on said head, a pivotal dog on said plate movable into said lug to lock said plate in intermediate position, and means for oscillating said plate about said axis.

6. In a metal polishing machine, in combination, a head, a plurality of guide rollers supported in generally parallel relation about said head, a tool belt running over said rollers, a base plate in which one of said rollers is journalled and which is mounted on said head for angular adjustment relative to the other of said rollers, means for defining the range of adjustment of said plate, a notched lug on said head, a dog on said plate movable into said lug to lock said plate in intermediate position, and means for oscillating said plate through said range.

7. In a metal polishing machine, in combination, a plurality of guide members including a roller mounted in generally parallel relation, an abrading or polishing belt running over said guide members, said roller being mounted for angular oscillation selectively into opposed limit positions to cause the belt to shift laterally respectively in opposite directions while traveling over said guide members, a reversible electric torque motor for oscillating said roller, control circuits for said motor, a photo-electric cell in said circuits and automatically operable through light interception thereto by one edge of said belt to effect operation of said motor in one direction to reverse the shift of said belt, and a photo-electric cell in said circuits and spaced from said first mentioned cell laterally of said belt and automatically operable upon the passage of light thereto past said belt edge to effect operation of said motor in the other direction to reverse the shift of said belt.

8. In a metal polishing machine, in combination, a plurality of guide members including a roller mounted in generally parallel relation, an abrading or polishing belt running over said guide members, said roller being mounted for angular oscillation selectively into opposed limit positions to cause the belt to shift laterally respectively in opposite directions while traveling over said guide members, a reversible electric torque motor for oscillating said roller, control circuits for said motor, a photo-electric cell in said circuits and automatically operable through light interception thereto by one edge of said belt to effect operation of said motor in one direction to reverse the shift of said belt, and a photo-electric cell in said circuits and spaced from said first mentioned cell laterally of said belt and automatically operable upon the passage of light thereto past said belt edge to effect operation of said motor in the other direction to reverse the shift of said belt, said cells being relatively adjustable toward and from each other laterally of said belt to adjust the range of belt shift, and being adjustable as a unit laterally of said belt to vary the location of said range.

9. In a metal polishing machine, in combination, a plurality of guide members including a roller mounted in generally parallel relation, an abrading or polishing belt running over said guide members, said roller being mounted for angular oscillation selectively into opposed limit positions to cause the belt to shift laterally respectively in opposite directions while traveling over said guide members, a reversible electric motor for oscillating said roller, primary control circuits for said motor and operable by two electromagnetic elements to effect operation of said motor respectively in opposite directions, one set of secondary control circuits for one of said elements and including a grid-glow tube having a normal potential sufficient to effect excitation of said one element and including a photo-electric cell operable to reduce said potential to a value inadequate to effect excitation of said one element, a second set of secondary control circuits for the other of said elements and including a grid-glow tube having a normal potential inadequate to effect excitation of said other element, and including a photo-electtric cell operable to increase said last mentioned potential to a value sufficient to effect excitation of said other element, two light sources associated respectively with said cells, one edge of said belt being movable between said cells and light sources and being operable in its lateral reciprocatory movement alternately to intercept light to said first mentioned cell and to pass light to said second mentioned cell.

10. In a metal polishing or abrading machine, in combination, a support, a U-shaped bracket mounted on said support, a downwardly opening photo-electric cell mounted on one leg of said bracket, a light source mounted on the other leg of said bracket for directing a beam of light upwardly into said cell, a tool belt traveling longitudinally between said cell and light source, means for supporting and guiding said belt, said belt being laterally shiftable reversibly to intercept and alternately to pass said beam, and means responsive to said cell for controlling the shift of said belt.

11. In a metal polishing or abrading machine, in combination, a plurality of generally parallel guide rollers, a continuous tool belt running over said rollers, means supporting one of said rollers for angular adjustment out of a neutral position in either direction to effect a lateral shifting of the belt in a corresponding direction, power operable means for shifting said supporting means to adjust the position of the roller, and adjustable stop means acting independently of said power operable means for limiting the adjustment of the roller to a predetermined range.

12. In a metal polishing or abrading machine, in combination, a plurality of generally parallel guide rollers, a continuous tool belt running over said rollers, one of said rollers being angularly adjustable out of a neutral position selectively in either direction to effect a lateral shifting of said belt, power operable means for adjusting said one roller, and stop means acting independently of said power operable means for limiting the angular adjustment of the roller to a predetermined range.

13. In a metal polishing or abrading machine, in combination, a plurality of generally parallel guide rollers, a continuous tool belt running over said rollers, one of said rollers being angularly adjustable out of a neutral position selectively in either direction to cause said belt to shift laterally in a corresponding direction, stop means for limiting the angular adjustment of said one roller to a predetermined range, latch means including a member movable with said one roller and engageable with a stationary member for locking the roller in a neutral position, and power operable means operable automatically upon the disengagement of said members to effect said adjustment.

JOSEPH O. OLSEN.